United States Patent
Wu et al.

(10) Patent No.: US 9,653,111 B1
(45) Date of Patent: May 16, 2017

(54) TRACK QUALITY CLASSIFIER

(71) Applicant: Avago Technologies General IP (Singapore) Pte. Ltd., SG (SG)

(72) Inventors: Xuebin Wu, San Jose, CA (US); Yuqing Yang, Shanghai (CN); Yang Han, Sunnyvale, CA (US); Shaohua Yang, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/949,657

(22) Filed: Nov. 23, 2015

(51) Int. Cl.
  *G11B 21/02* (2006.01)
  *G11B 20/10* (2006.01)
  *G11B 5/012* (2006.01)
  *G11B 27/36* (2006.01)
  *G11B 5/09* (2006.01)

(52) U.S. Cl.
  CPC ........ *G11B 20/10305* (2013.01); *G11B 5/012* (2013.01); *G11B 5/09* (2013.01); *G11B 27/36* (2013.01); *G11B 2220/20* (2013.01); *G11B 2220/90* (2013.01)

(58) Field of Classification Search
  None
  See application file for complete search history.

(56) References Cited

U.S. PATENT DOCUMENTS

| | | | | |
|---|---|---|---|---|
| 5,564,013 A | * | 10/1996 | Ito | G11B 7/0941 369/44.32 |
| 8,625,216 B2 | * | 1/2014 | Zhang | G11B 5/59688 360/39 |
| 8,705,192 B1 | | 4/2014 | Zhang et al. | |
| 9,053,747 B1 | | 6/2015 | Zhang et al. | |
| 2002/0064379 A1 | * | 5/2002 | Kawashima | G11B 19/04 386/269 |
| 2004/0051988 A1 | * | 3/2004 | Jing | G11B 19/04 360/31 |
| 2005/0052770 A1 | * | 3/2005 | Osafune | G11B 5/09 360/51 |
| 2009/0034380 A1 | * | 2/2009 | Ngwe | G11B 20/1217 369/47.15 |
| 2010/0172046 A1 | * | 7/2010 | Liu | G11B 20/10009 360/39 |

* cited by examiner

*Primary Examiner* — Tan X Dinh
(74) *Attorney, Agent, or Firm* — Sheridan Ross P.C.

(57) ABSTRACT

An apparatus includes a storage medium operable to store a number of data tracks, a read channel circuit operable to process the data tracks read from the storage medium, and a track quality classifier circuit operable to determine a track quality metric for the data tracks read from the storage medium. The track quality metric indicates whether a corresponding one of the data tracks that has failed to successfully process in the read channel circuit can be reprocessed within a track gap period.

20 Claims, 5 Drawing Sheets

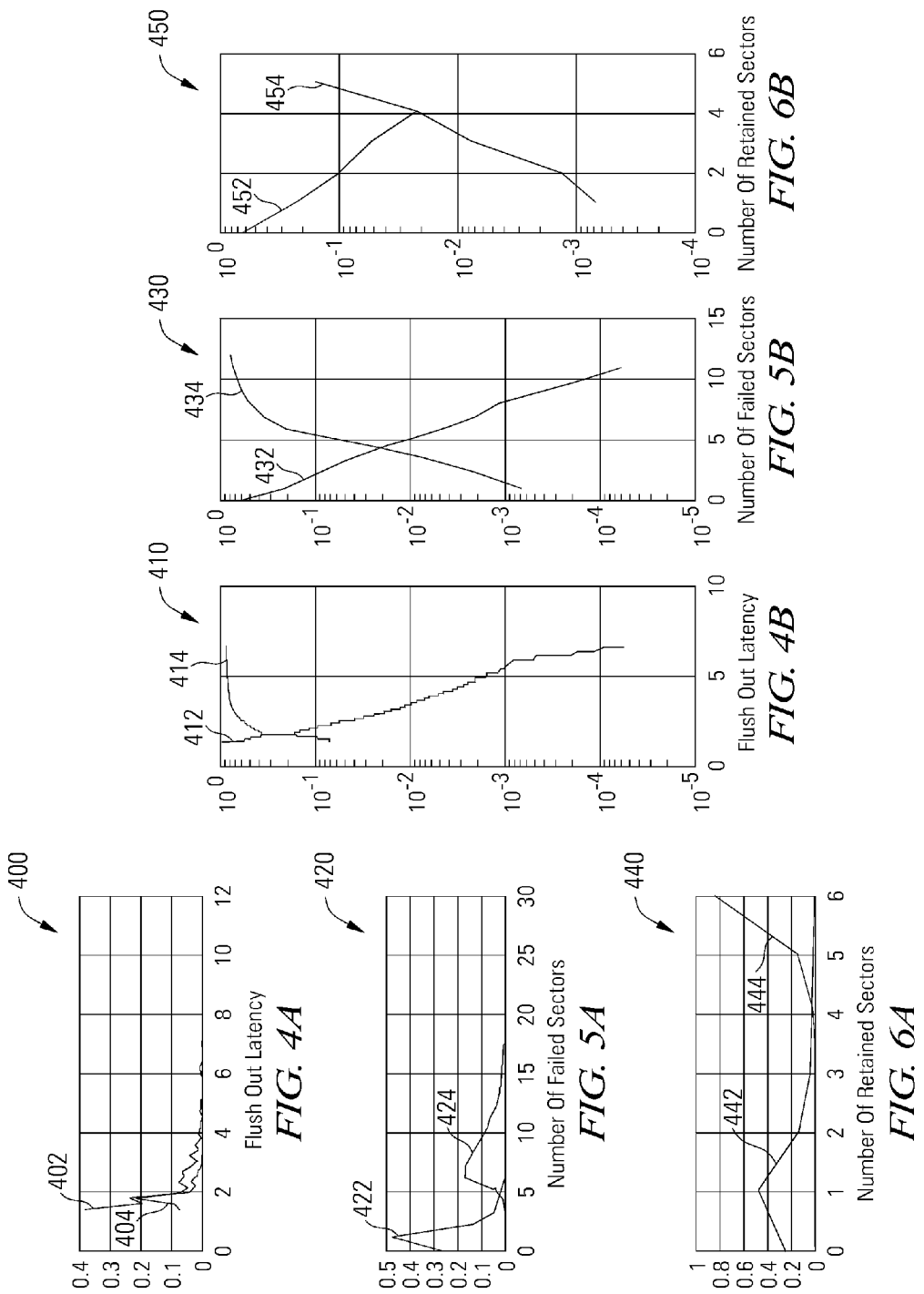

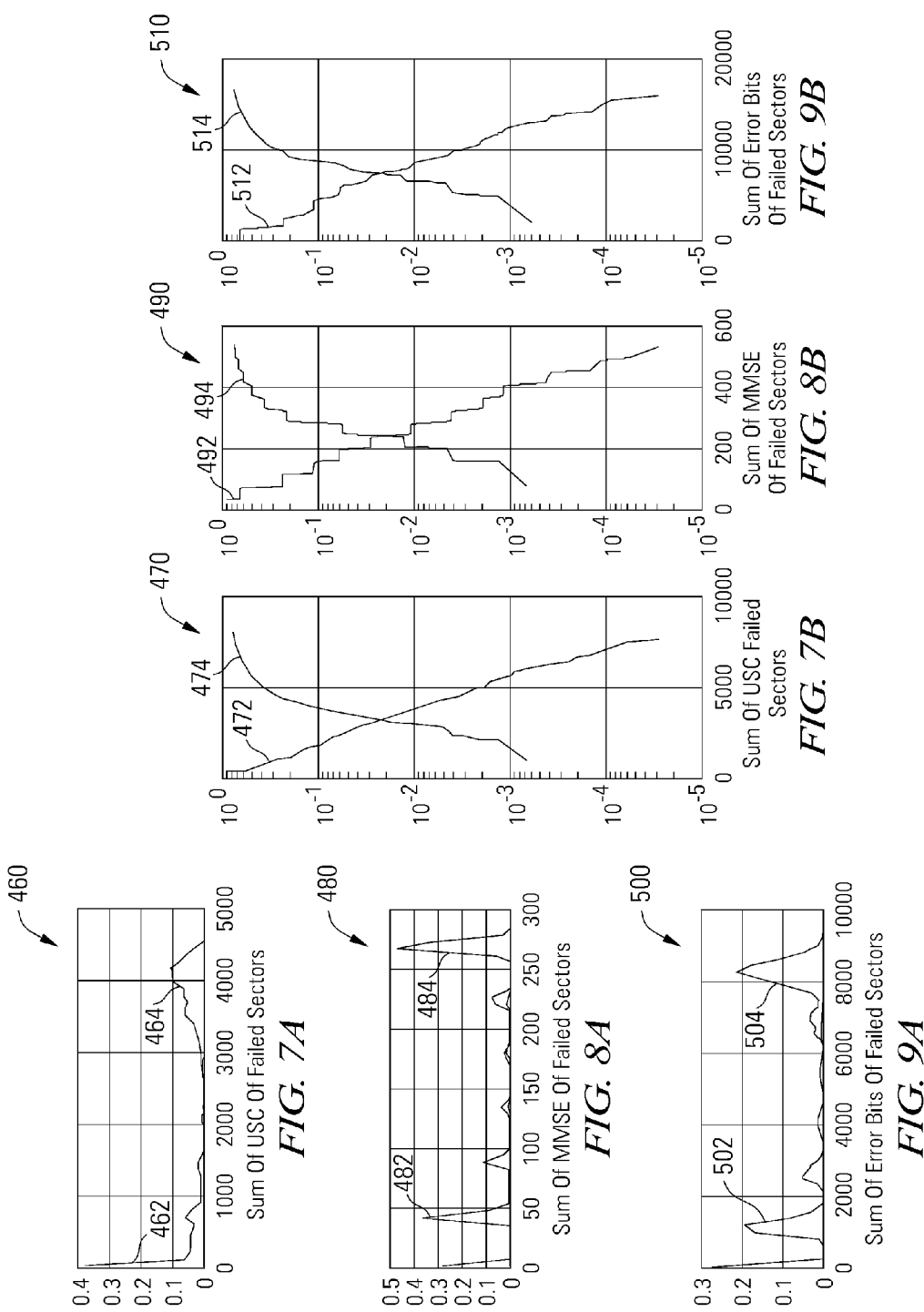

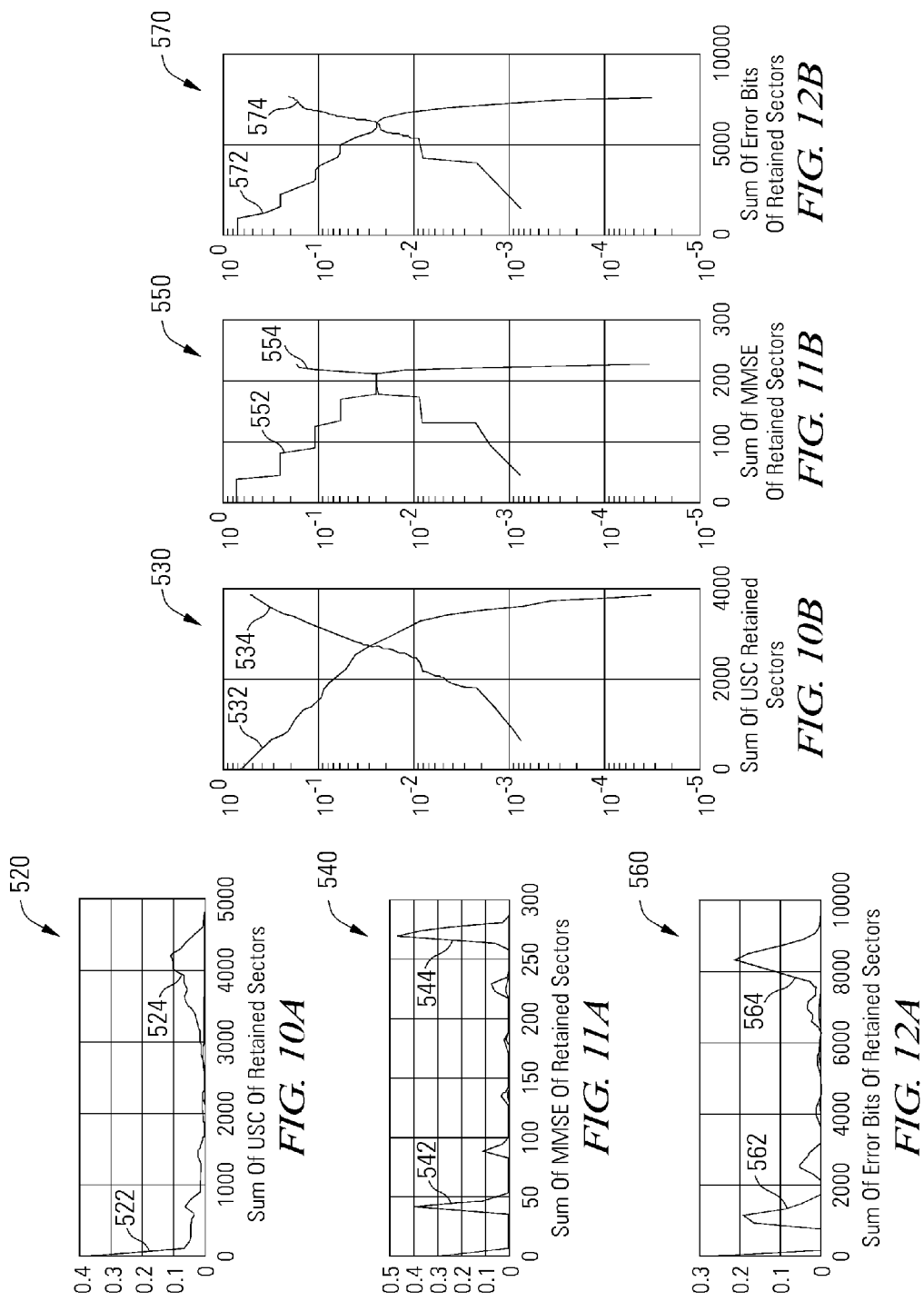

TRACK QUALITY CLASSIFIER

FIELD OF THE INVENTION

Various embodiments of the present invention provide systems and methods for processing data, and more particularly to systems and methods for classifying tracks by quality metrics in a magnetic storage device to determine when tracks that have failed to be successfully decoded can be reprocessed within a particular time frame.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Many types of error checking systems have been developed to detect and correct errors in digital data. For example, parity bits can be added to groups of data bits, ensuring that the groups of data bits (including the parity bits) have either even or odd numbers of ones. The parity bits can be used in error correction systems, including in low density parity check (LDPC) decoders. When decoding of data fails, retry operations can be used to attempt to decode the data using a variety of recovery algorithms. However, the time available to perform retry operations is limited, and some data may not be possible to successfully decode within available time limits.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

FIG. 4A is a plot of flush out latency for tracks that can be reprocessed within a track gap and for tracks that cannot be reprocessed within a track gap;

FIG. 4B is a plot, for a given flush out latency threshold, of the probability of making the wrong decision on a good track and the probability of making the wrong decision on a bad track;

FIG. 5A is a plot of the number of failed sectors for tracks that can be reprocessed within a track gap and for tracks that cannot be reprocessed within a track gap;

FIG. 5B is a plot, for a given threshold of the number of failed sectors, of the probability of making the wrong decision on a good track and the probability of making the wrong decision on a bad track;

FIG. 6A is a plot of the number of retained sectors for tracks that can be reprocessed within a track gap and for tracks that cannot be reprocessed within a track gap;

FIG. 6B is a plot, for a given threshold of the number of retained sectors, of the probability of making the wrong decision on a good track and the probability of making the wrong decision on a bad track;

FIG. 7A is a plot of the sum of the unsatisfied checks in failed sectors for tracks that can be reprocessed within a track gap and for tracks that cannot be reprocessed within a track gap;

FIG. 7B is a plot, for a given threshold of the sum of the unsatisfied checks in failed sectors, of the probability of making the wrong decision on a good track and the probability of making the wrong decision on a bad track;

FIG. 8A is a plot of the sum of the minimum mean square error in failed sectors for tracks that can be reprocessed within a track gap and for tracks that cannot be reprocessed within a track gap;

FIG. 8B is a plot, for a given threshold of the sum of the minimum mean square error in failed sectors, of the probability of making the wrong decision on a good track and the probability of making the wrong decision on a bad track;

FIG. 9A is a plot of the sum of the error bits in failed sectors for tracks that can be reprocessed within a track gap and for tracks that cannot be reprocessed within a track gap;

FIG. 9B is a plot, for a given threshold of the sum of the error bits in failed sectors, of the probability of making the wrong decision on a good track and the probability of making the wrong decision on a bad track;

FIG. 10A is a plot of the sum of the unsatisfied checks in retained sectors for tracks that can be reprocessed within a track gap and for tracks that cannot be reprocessed within a track gap;

FIG. 10B is a plot, for a given threshold of the sum of the unsatisfied checks in retained sectors, of the probability of making the wrong decision on a good track and the probability of making the wrong decision on a bad track;

FIG. 11A is a plot of the sum of the minimum mean square error in retained sectors for tracks that can be reprocessed within a track gap and for tracks that cannot be reprocessed within a track gap;

FIG. 11B is a plot, for a given threshold of the sum of the minimum mean square error in retained sectors, of the probability of making the wrong decision on a good track and the probability of making the wrong decision on a bad track;

FIG. 12A is a plot of the sum of the error bits in retained sectors for tracks that can be reprocessed within a track gap and for tracks that cannot be reprocessed within a track gap;

FIG. 12B is a plot, for a given threshold of the sum of the error bits in retained sectors, of the probability of making the wrong decision on a good track and the probability of making the wrong decision on a bad track.

DETAILED DESCRIPTION OF THE INVENTION

Figure 1:
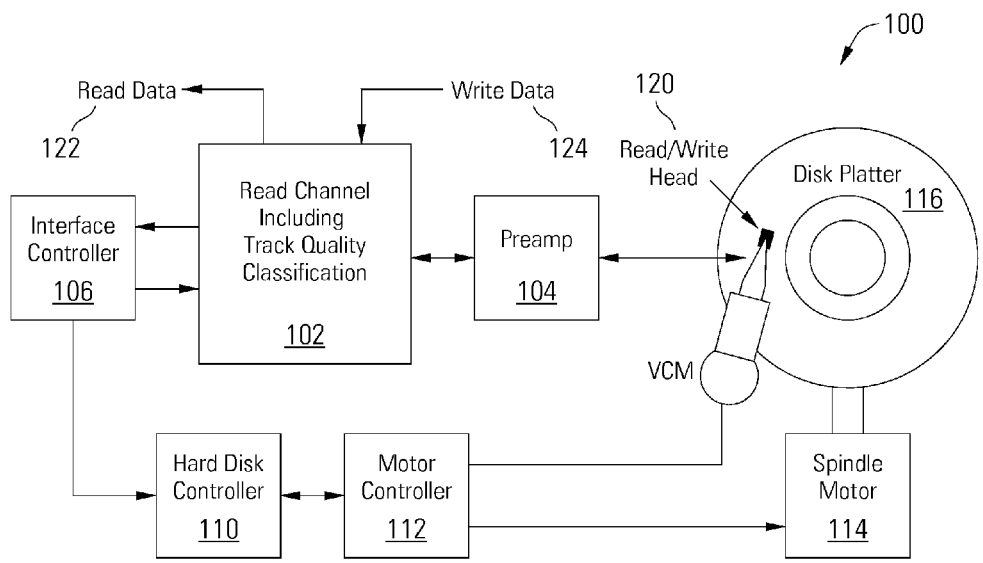
FIG. 1 depicts a storage system including a read channel with track quality classification in accordance with some embodiments of the present invention.

Embodiments of the present invention are related to systems and methods for classifying tracks by quality metrics in a magnetic storage device to determine when tracks that have failed to be successfully decoded can be reprocessed within a track gap between normal processing of data tracks. In a typical magnetic storage system, digital data is stored in a series of concentric circular tracks along a storage medium. Each data track can be divided into many data sectors. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

When a hard disk controller issues a read command for a data track, each sector in the track is retrieved by the head assembly and data corresponding to the sector is processed. The processing can include, for example, performing a data detection algorithm to detect values of bits or multi-bit symbols in the data, and performing a decoding algorithm to detect and correct errors in the data. Such a decoding algorithm can include, for example, using parity checks with parity bits embedded in the data according to a low density parity check code. The detection/decoding process is continued until all parity checks have been satisfied (i.e., the data has converged) or until a limit on the number of detection/decoding iterations has been reached and processing of the sector has failed. Parity checks can be satisfied either because any errors in the decoded data have been corrected, or because combinations of errors result in the parity checks being satisfied and the data has been miscorrected. In some embodiments, additional techniques can be applied to identify miscorrected sectors.

Attempts can be made to reprocess any tracks with sectors that have failed to converge, or in some cases with sectors that have been miscorrected and thus have failed to decode. Such attempts can be made either by reprocessing failed sectors in the track that have been retained in memory during gaps in between reading other tracks, or by rereading and reprocessing the track, which postpones reading of other tracks and increases system latency.

The track quality classification disclosed herein distinguishes failed tracks that can be reprocessed in the track gaps between normal processing of other tracks (referred to herein as "good" tracks), and failed tracks that would take too much time and thus cannot be reprocessed in track gaps (referred to herein as "bad" tracks). Metrics are established to identify good tracks, and the system is allowed to reprocess good tracks in track gaps. Failed tracks identified as bad tracks are not reprocessed in track gaps, but are identified in some embodiments to the hard disk controller or other system controller so that it can issue a retry for the bad track so that it can be reread and reprocessed in the normal track read schedule.

Turning to FIG. 1, a storage system 100 is depicted with a read channel with track quality classification in accordance with some embodiments of the present invention. The storage system 100 includes a read channel circuit 102 with track quality classification in accordance with one or more embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 digitizes and decodes the received analog signal to recreate the information originally written to disk platter 116. This data is provided as read data 122 to a receiving circuit. While processing the read data, read channel circuit 102 generates a track quality classification, identifying failed tracks as either good, enabling them to be reprocessed in track gaps, or as bad, requiring a retry to be issued. A write operation is substantially the opposite of the preceding read operation with write data 124 being provided to read channel circuit 102.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory can be used as a cache where it offers faster access time than that offered by disk platter 116. In such a case, the solid state memory can be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
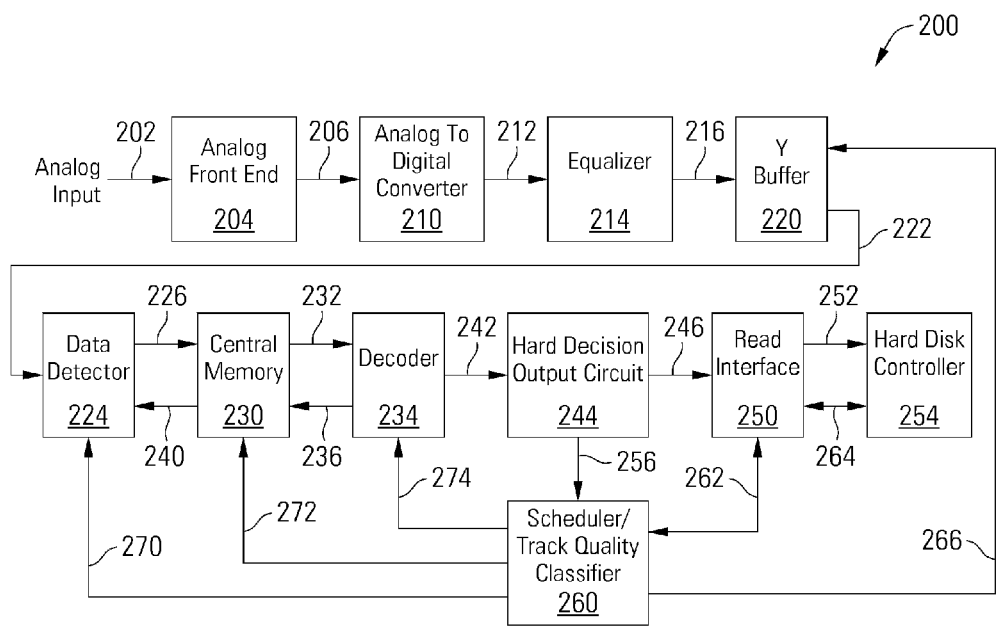
FIG. 2 depicts a read channel with track quality classifier in accordance with some embodiments of the present invention.

Turning to FIG. 2, a read channel circuit with track quality classifier 200 is depicted in accordance with some embodiments of the present invention. Read channel 200 includes an analog front end circuit 204 that receives an analog signal 202 derived from a read/write head assembly that is disposed in relation to a storage medium. Analog front end circuit 204 processes analog signal 202 and provides a processed analog signal 206 to an analog to digital converter circuit 210. Analog front end circuit 204 may include, but is not limited to, an analog filter and an amplifier circuit as are known in the art. Based upon the disclosure provided herein, one of ordinary skill in the art will recognize a variety of circuitry that may be included as part of analog front end circuit 204.

Analog to digital converter circuit 210 converts processed analog signal 206 into a corresponding series of digital samples 212. Analog to digital converter circuit 210 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 212 are provided to an equalizer circuit 214. Equalizer circuit 214 applies an equalization algorithm to digital samples 212 to yield an equalized output 216. In some embodiments of the present inventions, equalizer circuit 214 is a digital finite impulse response (DFIR) filter circuit as are known in the art. Equalized output 216 is stored in a memory or Y buffer 220. In some cases, equalized output 216 is received directly from a storage device in, for example, a solid state storage system. In such cases, analog front end circuit 204, analog to digital converter circuit 210 and equalizer circuit 214 can be eliminated where the data is received as a digital data input.

Equalized data 222 from Y buffer 220 is provided to a data detector circuit 224, which is operable to apply a data detection algorithm to a received data set or sector, and in some cases data detector circuit 224 can process two or more codewords in parallel. In some embodiments of the present invention, data detector circuit 224 is a Viterbi algorithm data detector circuit as is known in the art. In other embodiments of the present inventions, data detector circuit 224 is a maximum a posteriori data detector circuit as is known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present inventions. Data detector circuit 224 is started based upon availability of a data set from Y buffer 220 or from a central memory circuit 230.

Upon completion, data detector circuit 224 provides detected output 226, or soft data. As used herein, the phrase "soft data" is used in its broadest sense to mean reliability data with each instance of the reliability data indicating a likelihood that a corresponding bit position or group of bit positions has been correctly detected. In some embodiments of the present inventions, the soft data or reliability data is log likelihood ratio data as is known in the art. Detected output 226 is stored in central memory circuit 230. The detected output 232 is accessed from central memory circuit 230 and provided to a decoder 234, such as, but not limited to, a low density parity check decoder. Based upon the disclosure provided herein, one of ordinary skill in the art will recognize other decoding algorithms that may be used in relation to different embodiments of the present invention. The decoder 234 applies a data decode algorithm to detected output 232 in a variable number of local iterations.

Where the decoder 234 fails to converge (i.e., fails to yield the originally written data set) and a number of local iterations through decoder 234 exceeds a threshold, the resulting soft information can be provided as a decoded output 236 back to central memory circuit 230 where it is stored awaiting another global iteration through data detector circuit 224 and decoder 234. Once data detector circuit 224 is available, a previously stored decoded output 240 is accessed from central memory circuit 230 and is used to guide subsequent detection of a corresponding data set received as equalized data 222. Multiple sectors may be processed simultaneously in the read channel 200, with additional sectors being admitted to the data detector 224 as other sectors converge in the decoder 234 and are output and cleared from the Y buffer 220 and central memory circuit 230.

Alternatively, where the decoded output converges (i.e., yields the originally written data set) in the decoder 234, the resulting decoded output is provided as an output codeword 242 to a hard decision output circuit 244. Hard decisions 246 representing the actual bit or symbol values for the sector are provided to a read interface 250, which in some embodiments can perform additional error checking such as cyclic redundancy checks (CRC). Data 252 can then be forwarded to a hard disk controller 254 or other destination. Successfully decoded sectors can be combined in tracks in any suitable location, such as, but not limited to, in read interface 250 or hard disk controller 254.

Sectors that fail to converge in the decoder 234 or that are miscorrected are kicked out of the read channel 200, meaning that the corresponding decoder output 242 is output from the system along with an indication that the sector failed to converge. Data corresponding to failed sectors can either be cleared from Y buffer 220 and central memory 230, making room for another sector to be processed, or can be retained in Y buffer 220 and central memory 230, allowing the failed sector to be reprocessed in data detector circuit 224 and decoder 234 in track gaps between processing of other tracks. In some embodiments, failed sectors are retained Y buffer 220 and central memory 230 when no other sectors are waiting to be processed, although other criteria can be used to determine when to retain failed sectors.

Detection and decoding are controlled by a scheduler 260, which can generate control signals (e.g., 266, 270, 272, 274) to control loading of sector data into memories 220, 230, initiation of detection and decoding processes, kickout of decoder output and retaining of failed sector data, etc. In embodiments in which the track quality classification is implemented in the scheduler 260, metric information 256 can be received by the scheduler 260 from any suitable source for track quality classification, and status signals 262, 264 can be used to communicate track quality classifications to the controller, identifying bad failed tracks for which re-read and reprocess commands should be issued.

Figure 3A:
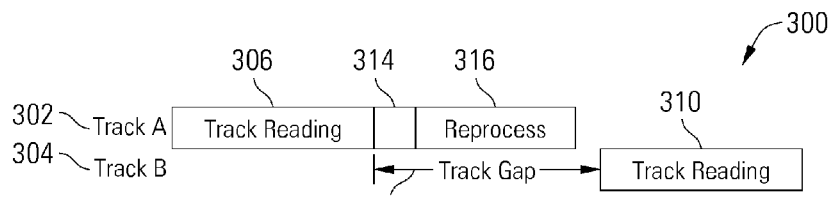
FIG. 3A depicts a track gap between two successive tracks with a failed track being successfully reprocessed within the track gap.

Turning to FIG. 3A, a diagram 300 depicts reading of two successive tracks 302, 304. The first track 302 is read in a first period 306 and the second track 304 is read in a second period 310, with a track gap 312 separating the two track reading periods 306, 310. A flush out latency period 314 follows each track reading period 306, representing the latency from the end of the last read gate triggering the reading of a sector in the track 302 and the last kickout when the hard decisions for the last sector to be read in the track 302 is output. If the first track 302 fails to be successfully processed during its track reading period 306, the failed sectors in the track 302 can be reprocessed in the track gap 312 before the processing period 310 for the next track 304. If the failed track 302 can be reprocessed in a period (e.g., 316) in the track gap 312, the failed track 302 is referred to herein as a good track.

Figure 3B:
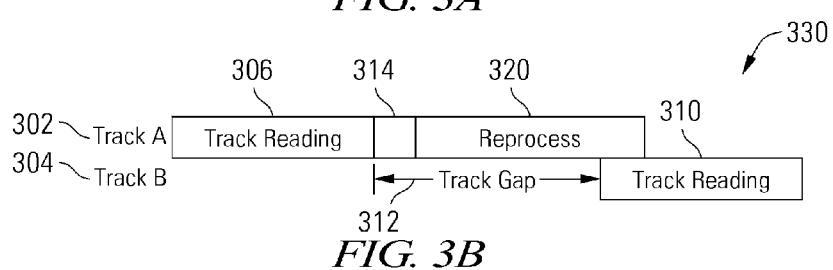
FIG. 3B depicts a track gap between two successive tracks with a failed track that cannot be successfully reprocessed within the track gap.

In the diagram 330 of FIG. 3B, a reprocessing period 320 for another failed track is depicted. In this case, the failed track 302 cannot be reprocessed in the track gap 312 before the next track's processing period 310 begins. The failed track 302 in the case of FIG. 3B is referred to herein as a bad track. If the system were to attempt to reprocess the failed track 302 in the track gap 312, it would not complete before the controller initiated the read of the next track 304, and the reprocessing would have to be terminated unsuccessfully.

The track quality classifier disclosed herein uses one or more metrics to determine whether a failed track can likely be successfully reprocessed within a track gap. Those identified as good failed tracks based on the metrics can likely be successfully reprocessed within a track gap and are allowed to be reprocessed during the track gap. Those identified as bad tracks based on the metrics likely cannot be successfully reprocessed within a track gap and are not allowed to be reprocessed during the track gap. Bad failed tracks are identified to the controller so that it can issue a retry for the failed track, causing it to be re-read and reprocessed during a normal track read period (e.g., 306 or 310).

The track quality classification can be performed by a classification circuit in any location having access to metric information, such as in the scheduler 260, controller 254 or in any other suitable location. Any suitable metric can be used to perform the track quality classification, and in some embodiments, multiple metrics are used in a joint metric. The suitability of a metric for use in track quality classification can depend on a number of factors, such as, for example, availability of data for the metric, whether the metric distinguishes between failed sectors that can be reprocessed in a track gap and those that cannot, and the whether the nature of the metric can be used to characterize sectors on the fly.

Turning to FIG. 4A, a plot 400 depicts the flush out latency for good failed tracks 402 that can be reprocessed within a track gap and for bad failed tracks 404 that cannot be reprocessed within a track gap. Notably, the flush out latency is substantially overlapping for good failed tracks 402 and for bad failed tracks 404. In other words, there is not a particular measurement of flush out latency or a particular point on the X-axis that could be selected between flush out latency values for good failed tracks versus flush out latency values for bad failed tracks. Thus, flush out latency is not a good candidate for use as a metric for track quality classification to distinguish good failed tracks from bad failed tracks.

FIG. 4B depicts a corresponding plot 410 with curves 412, 414 showing the probability of making the wrong decision or characterization on a good track and the probability of making the wrong decision on a bad track, respectively, at a given threshold for flush out latency of failed tracks. The X-axis corresponds to the threshold value for flush out latency, and the Y-axis corresponds to the probability of a wrong decision. If there were a good location for a threshold in FIG. 4A to distinguish good failed tracks from bad failed tracks, the plot 410 of FIG. 4B could be used to optimize the threshold value to balance the probability of making the wrong decision on good tracks (incorrectly characterizing a good track as bad) versus the probability of making the wrong decision on bad tracks (incorrectly characterizing a bad track as good).

Turning to FIG. 5A, a plot 420 depicts the number of failed sectors in a good track 422 and the number of failed sectors in a bad track 424. Notably, there is a distinct difference in the number of failed sectors in good failed tracks and bad failed tracks, with a peak in the distribution in the number of failed sectors in a good track 422 at about 1 failed sector per good track, and a different peak in the distribution in the number of failed sectors in a bad track 424 at about 6 failed sectors per bad track. A threshold in the number of failed sectors in a track could be used to distinguish good tracks from bad tracks when determining whether to reprocess a failed track in a track gap. When reading a track, if one or more sectors failed to correctly converge during normal processing, the number of failed sectors in the track could be compared with the threshold, and if it was less than the threshold, indicating that the track was good, the system could attempt to reprocess the failed sectors of the track during the track gap. If the number of failed sectors in the track was greater than the threshold, indicating that the track was bad, the system would not attempt to reprocess the failed sectors of the track during the track gap, and would instead indicate to the controller that the track was not successfully read so that it could issue a retry command to re-read and reprocess the track during a different normal track processing period.

A corresponding plot 430 in FIG. 5B depicts the probability of making the wrong decision on a good track 432 and the probability of making the wrong decision on a bad track 434, respectively, at a given threshold for the number of failed sectors in a track. This comparison between the probability of one type of incorrect characterization and the probability of the other type of incorrect characterization can be used to set the threshold level for the metric to be used as a track quality classifier. For example, to minimize the likelihood of the wrong threshold placement for both good failed tracks and bad failed tracks, and because the probabilities trend in different directions, the threshold could be placed at or near the crossover point to minimize the likelihood of the wrong threshold placement for both good failed tracks and bad failed tracks. If the impact of making one type of wrong decision is more significant than the other type of wrong decision, the threshold can be shifted one way or the other to reduce the likelihood of the more significant type of wrong decision. For example, if incorrectly characterizing a bad failed track as good and allowing the system to unsuccessfully attempt to reprocess it in a track gap is more problematic than incorrectly characterizing a good failed track as bad and not allowing the system to reprocess it in a track gap when it could have succeeded, then the threshold could be shifted to the left in FIG. 5B to reduce the likelihood of incorrectly characterizing a bad failed track as good.

Turning to FIG. 6A, a plot 440 depicts the number of retained sectors in a good track 442 and the number of failed sectors in a bad track 444. Again, a retained sector is a sector that has failed to be correctly decoded and is retained in memory after kickout so that it can be reprocessed. There is a distinct difference in the number of retained sectors in good failed tracks and bad failed tracks, with a peak in the distribution in the number of retained sectors in a good track 442 at about 1.3 retained sectors per good track, and a different peak in the distribution in the number of failed sectors in a bad track 444 at above 6 retained sector per bad track. A threshold in the number of retained sectors in a track could be used to distinguish good tracks from bad tracks when determining whether to reprocess a failed track in a track gap.

A corresponding plot 450 in FIG. 6B depicts the probability of making the wrong decision on a good track 432 and the probability of making the wrong decision on a bad track 434, respectively, at a given threshold for the number of retained sectors in a track. Again, this comparison between the probability of one type of incorrect characterization and the probability of the other type of incorrect characterization can be used to adjust the threshold level for the metric to be used as a track quality classifier. For example, to minimize the likelihood of the wrong threshold placement for both good failed tracks and bad failed tracks, the threshold can be placed at or near the crossover point to minimize the likelihood of the wrong threshold placement for both good failed tracks and bad failed tracks.

Again, flush out latency is not a distinguishable metric as shown in FIG. 4A. While the number of failed sectors and the number of retained sectors are distinguishable and can be used as a track quality classifier, the metric values are small integers and it is difficult to finely tune the classifier performance. For example, for both the number of failed sectors and the number of retained sectors, the crossing point is at around 4.5. The threshold could be set at either 4 or 5, which would favor one type of incorrect characterization at the expense of the other. If this type of skewed balance is desired, these would be good metrics to use for track quality classification, but if a more equal balance is desired, these may not be the best metrics to use.

Turning to FIG. 7A, a plot 440 depicts the sum of the number of unsatisfied parity checks in failed sectors in a good track 442 and the sum of the number of unsatisfied parity checks in failed sectors in a bad track 444. As can be clearly seen, this metric can be used with a threshold to distinguish good tracks from bad tracks when determining whether to reprocess a failed track in a track gap.

A corresponding plot 470 in FIG. 7B depicts the probability of making the wrong decision on a good track 472 and the probability of making the wrong decision on a bad track 474, respectively, at a given threshold for the sum of the number of unsatisfied parity checks in failed sectors of a track. Again, this comparison between the probability of one type of incorrect characterization and the probability of the other type of incorrect characterization can be used to adjust the threshold level for the metric to be used as a track quality classifier. For example, to minimize the likelihood of the wrong threshold placement for both good failed tracks and bad failed tracks, the threshold can be placed at or near the crossover point, in this case about 3000, to minimize the likelihood of the wrong threshold placement for both good failed tracks and bad failed tracks. Furthermore, because this metric has higher values, the balance between incorrect decisions on good tracks and incorrect decisions on bad tracks can be precisely adjusted.

There are two different distributions in the sum of the number of unsatisfied parity checks in failed sectors of good tracks and bad tracks because the reprocessing time is not directly linked to the number of unsatisfied checks. A trapping set in a low density parity check code for example might be very difficult and time consuming to recover from, for example requiring exhaustive and lengthy targeted symbol flipping to overcome, but might still have a relatively low number of unsatisfied parity checks, whereas another failure mode that results in a large number of unsatisfied parity checks might respond more quickly to retry operations and can therefore be reprocessed successfully within a track gap. When considered in the aggregate, different failure modes combine in such a way that separates the distribution of the metric for good tracks and bad tracks. This distinction is also true for many other types of metrics. By simulating many failed tracks, which might fail for any number of reasons, such as, but not limited to, inter-track interference, inter-symbol interference, external noise, trapping sets, etc., and determining how long successful reprocessing takes for those failed tracks, the resulting metrics associated with reprocessing the failed tracks can be analyzed to determine whether they are good metrics to use for track quality classification. Thus, FIG. 7A indicates that failed tracks that can be successfully reprocessed within the track gap have a peak in the metric distribution at just over 0, and that failed tracks that cannot be successfully reprocessed within the track gap have a peak in the metric distribution at just over 4000. By comparing the probabilities of the two types of incorrect decisions in FIG. 7B, the threshold can be tuned to the crossover point, or can be skewed to favor one type of incorrect decision over the other.

Turning to FIG. 8A, a plot 480 depicts the sum of the minimum mean square error in failed sectors in a good track 482 and the sum of the minimum mean square error in failed sectors in a bad track 484. As can be clearly seen, this metric can be used with a threshold to distinguish good tracks from bad tracks when determining whether to reprocess a failed track in a track gap.

A corresponding plot 490 in FIG. 8B depicts the probability of making the wrong decision on a good track 492 and the probability of making the wrong decision on a bad track 494, respectively, at a given threshold for the sum of the minimum mean square error in failed sectors of a track. Again, this comparison between the probability of one type of incorrect characterization and the probability of the other type of incorrect characterization can be used to adjust the threshold level for the metric to be used as a track quality classifier, for example setting the threshold at or near the crossover point.

Turning to FIG. 9A, a plot 500 depicts the sum of the error bits in failed sectors in a good track 502 and the sum of the error bits in failed sectors in a bad track 504. As can be clearly seen, this metric can be used with a threshold to distinguish good tracks from bad tracks when determining whether to reprocess a failed track in a track gap.

A corresponding plot 510 in FIG. 9B depicts the probability of making the wrong decision on a good track 512 and the probability of making the wrong decision on a bad track 514, respectively, at a given threshold for the sum of the error bits in failed sectors of a track. Again, this comparison between the probability of one type of incorrect characterization and the probability of the other type of incorrect characterization can be used to adjust the threshold level for the metric to be used as a track quality classifier, for example setting the threshold at or near the crossover point.

Turning to FIG. 10A, a plot 520 depicts the sum of the number of unsatisfied parity checks in retained sectors in a good track 522 and the sum of the number of unsatisfied parity checks in retained sectors in a bad track 524. As can be clearly seen, this metric can be used with a threshold to distinguish good tracks from bad tracks when determining whether to reprocess a failed track in a track gap.

A corresponding plot 530 in FIG. 10B depicts the probability of making the wrong decision on a good track 532 and the probability of making the wrong decision on a bad track 534, respectively, at a given threshold for the sum of the number of unsatisfied parity checks in retained sectors of a track. Again, this comparison between the probability of one type of incorrect characterization and the probability of the other type of incorrect characterization can be used to adjust the threshold level for the metric to be used as a track quality classifier, for example setting the threshold at or near the crossover point.

Turning to FIG. 11A, a plot 540 depicts the sum of the minimum mean square error in retained sectors in a good track 542 and the sum of the minimum mean square error in retained sectors in a bad track 544. As can be clearly seen, this metric can be used with a threshold to distinguish good tracks from bad tracks when determining whether to reprocess a failed track in a track gap.

A corresponding plot 550 in FIG. 11B depicts the probability of making the wrong decision on a good track 552 and the probability of making the wrong decision on a bad track 554, respectively, at a given threshold for the sum of the minimum mean square error in retained sectors of a track. Again, this comparison between the probability of one type of incorrect characterization and the probability of the other type of incorrect characterization can be used to adjust the threshold level for the metric to be used as a track quality classifier, for example setting the threshold at or near the crossover point.

Turning to FIG. 12A, a plot 560 depicts the sum of the error bits in retained sectors in a good track 562 and the sum of the error bits in retained sectors in a bad track 564. As can be clearly seen, this metric can be used with a threshold to distinguish good tracks from bad tracks when determining whether to reprocess a failed track in a track gap.

A corresponding plot 570 in FIG. 12B depicts the probability of making the wrong decision on a good track 572 and the probability of making the wrong decision on a bad track 574, respectively, at a given threshold for the sum of the error bits in retained sectors of a track. Again, this comparison between the probability of one type of incorrect characterization and the probability of the other type of incorrect characterization can be used to adjust the threshold level for the metric to be used as a track quality classifier, for example setting the threshold at or near the crossover point.

The single metric classifiers depicted in FIGS. 7-12 have similar performance at the crossover point P(good→bad)=P(bad→good) where the probability of making the wrong decision on a good track equals the probability of making the wrong decision on a bad track. In some embodiments, the thresholds are adjusted using a cost matrix describing the cost of making wrong decisions according to P(good→bad)*cost(good→bad)+P(bad→good)*cost(bad*good).

In some embodiments, joint metrics are used as track quality classifiers by combining two or more of the single metrics disclosed above or of other single metrics. The single metric classifiers above can take the following format:

$$\begin{cases} \text{metric} \geq \text{threshold}, & \text{bad track} \\ \text{metric} < \text{threshold}, & \text{good track} \end{cases}$$

Failed tracks are classified on the fly by comparing the metric with the threshold and making the decision according to the distinction above. The threshold can be user programmable, and in some embodiments, the choice of metric can be made on the fly, for example by storing a value in a user programmable register.

Single metric classifiers are extended in some embodiments to joint metrics by introducing a cost function:

$$\begin{cases} f(\text{metric}_1, \text{metric}_2, \ldots, \text{metric}_n) \geq \text{threshold}, & \text{bad track} \\ f(\text{metric}_1, \text{metric}_2, \ldots, \text{metric}_n) < \text{threshold}, & \text{good track} \end{cases}$$

The multivariate cost function $f$ can have any arbitrary format, such as, but not limited to, linear or non-linear, continuous or discontinuous, etc. The performance of a number of joint metric classifiers can be simulated for a particular data processing system in any computational system such as, for example, Matlab. For example, Matlab classifier simulations using the total number of unsatisfied parity checks and the minimum mean square error of all failed sectors and of normal process latency as joint metrics yield the following results for NaiveBayes, Discriminant, Tree and K-Nearest Neighbor (KNN) classifiers:

| classifier: NaiveBayes | | |
|---|---|---|
| | good | bad |
| bad | 0 | 1 |
| good | 0.9611 | 0.038904 |

| classifier: Discriminant | | |
|---|---|---|
| | good | bad |
| bad | 0.09507 | 0.90493 |
| good | 0.99113 | 0.0088749 |

| classifier: Tree | | |
|---|---|---|
| | good | bad |
| bad | 0.18574 | 0.81426 |
| good | 0.99304 | 0.0069622 |

| classifier: KNN | | |
|---|---|---|
| | good | bad |
| bad | 0.20335 | 0.79665 |
| good | 0.99166 | 0.0083394 |

As shown in the tables above, the NaiveBayes classifier with joint metrics using the total number of unsatisfied parity checks and the minimum mean square error correctly identifies all bad tracks as bad tracks, correctly identifies about 96% of good tracks as good tracks, does not misidentify any bad tracks as good, and misidentifies only about 4% of good tracks as bad. The NaiveBayes classifier is therefore a good multivariate function to apply in the data processing system with joint metrics using the total number of unsatisfied parity checks and the minimum mean square error as a track quality classifier. This study assumes an equal cost of decision error of good→bad and bad→good, and hence minimizes the total decision error probability. As with single metric classifiers, the balance between the two types of misidentification errors can be controlled by minimizing cost function P(good→bad)*cost(good→bad)+P(bad-→good).

Figure 13:
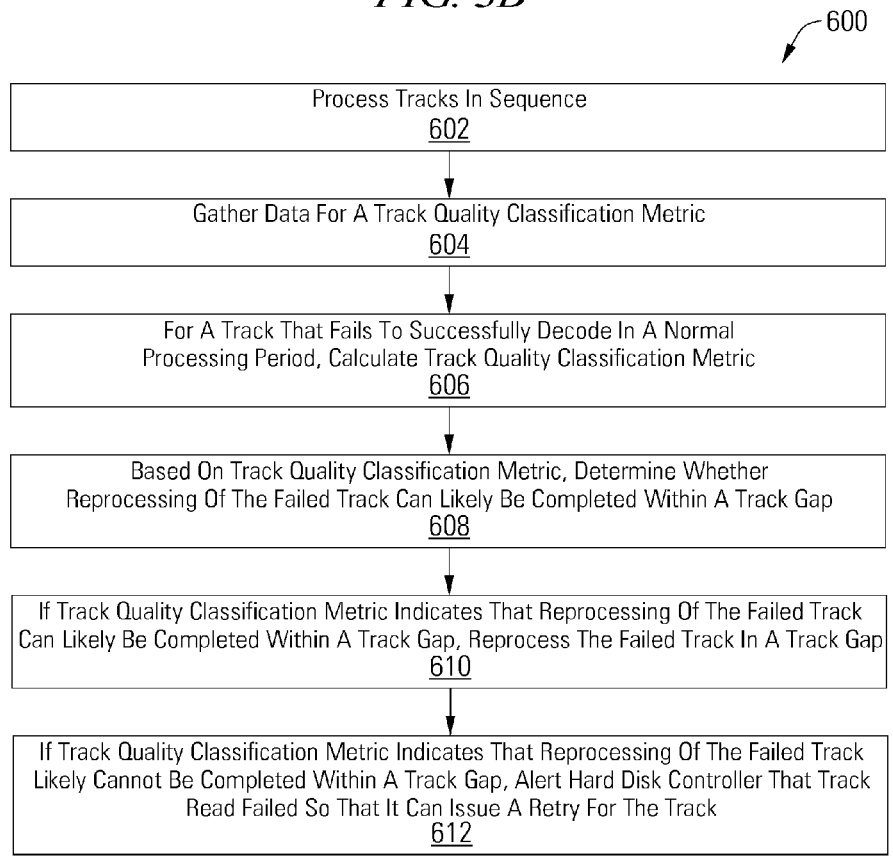
FIG. 13 is a flow diagram of an operation to classify track quality in a magnetic storage device in accordance with some embodiments of the present invention.

Turning to FIG. 13, a flow diagram 600 depicts an operation to classify track quality in a magnetic storage device in accordance with some embodiments of the present invention. Following flow diagram 600, tracks are processed in sequence in a data processing system. (Block 602) For example, in some embodiments, tracks are processed sector by sector, applying iterative data detection and decoding algorithms until data converges or until a limit on the number of iterations has been reached. Data for a track quality classification metric is gathered. (Block 604) Data can be gathered by any suitable circuit and in any suitable manner. For example, an accumulator can be used to add the number of unsatisfied parity checks in a decoder as the sectors in a track are being processed. For a track that fails to successfully decode in a normal processing period, calculate a track quality classification metric. (Block 606) As disclosed above, the track quality classification metric can be a single metric or a joint metric. Based on the track quality classification metric, determine whether reprocessing of the failed track can likely be completed within a track gap. (Block 608) The determination can be performed by comparing the metric or a multivariate multi-metric function with a threshold. If the track quality classification metric indicates that reprocessing of the failed track can likely be completed within a track gap, for example if the metric is less than a threshold, reprocess the failed track in a track gap. (Block 610) If the track quality classification metric indicates that reprocessing of the failed track likely cannot be completed within a track gap, for example if the metric is greater than or equal to a threshold, alert hard disk controller that the track read failed so that it can issue a retry for the track rather than allowing the track to be reprocessed in a track gap. (Block 612)

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for track quality classification to determine whether failed tracks can be reprocessed in a track gap. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus comprising:
a storage medium operable to store a plurality of data tracks;
a read channel circuit operable to process the data tracks read from the storage medium; and
a track quality classifier circuit operable to determine a track quality metric for the data tracks read from the storage medium, wherein the track quality metric indicates whether a corresponding one of the data tracks that has failed to successfully process in the read channel circuit can be reprocessed within a track gap period.

2. The apparatus of claim 1, wherein the track gap period comprises a period of time between an end of a read gate for one of the data tracks and a start of a read gate for a next one of the data tracks.

3. The apparatus of claim 1, wherein the track gap period comprises a period of time between an end of a last read gate for one of the data tracks and a start of a first read gate for a next one of the data track, minus a flush out latency from the end of the last read gate to a last kickout when hard decisions for said one of the data tracks have been output.

4. The apparatus of claim 1, further comprising a controller circuit, wherein the controller circuit is operable to issue a retry for said one of the data tracks that has failed to successfully process in the read channel circuit when the track quality classifier circuit has determined that said one of the data tracks cannot be reprocessed within the track gap period.

5. The apparatus of claim 1, wherein the track quality classifier circuit is operable to determine whether said one of the data tracks can be reprocessed within the track gap period by comparing the track quality metric with a threshold.

6. The apparatus of claim 5, wherein the threshold is set at a value that distinguishes a distribution in a metric for failed tracks that can be reprocessed within the track gap period from another distribution in the metric for failed tracks that cannot be reprocessed within the track gap period.

7. The apparatus of claim 6, wherein the threshold is tuned to balance a likelihood of an incorrect decision that a failed track can be reprocessed within the track gap period with another likelihood of an incorrect decision that a failed track cannot be reprocessed within the track gap period.

8. The apparatus of claim 5, wherein the threshold is user programmable.

9. The apparatus of claim 5, wherein the threshold is based at least in part on a cost function balancing a probability that reprocessing of one of the data tracks will take longer than the track gap period versus a cost of an incorrect determination.

10. The apparatus of claim 1, wherein the track quality metric comprises a joint metric based on a plurality of criteria.

11. The apparatus of claim 1, wherein the track quality metric comprises a sum of a number of unsatisfied parity checks in a decoder in the read channel circuit for failed sectors in the datatrack.

12. The apparatus of claim 1, wherein the track quality metric comprises a sum of a minimum mean square error for failed sectors in the data track.

13. The apparatus of claim 1, wherein the track quality metric comprises a sum of a number of unsatisfied parity checks in a decoder in the read channel circuit for retained sectors in the datatrack.

14. The apparatus of claim 1, wherein the track quality metric comprises a sum of a minimum mean square error for retained sectors in the data track.

15. The apparatus of claim 1, wherein the read channel circuit comprises a detector and a decoder in which data from the data tracks are iteratively processed.

16. A method of processing data in a magnetic storage device, comprising:
   processing a plurality of data tracks in sequence that have been retrieved from the magnetic storage device;
   gathering data for a track quality classification metric;
   for one of the plurality of data tracks that fails to successfully process in a processing period, calculate the track quality classification metric;
   based on the track quality classification metric, determine whether reprocessing of the failed track can likely be completed within a track gap period to classify said one of the plurality of data tracks as a good track; and
   causing the magnetic storage device to reprocess the good track in the track gap period.

17. The method of claim 16, wherein determining whether reprocessing of the failed track can likely be completed within the track gap period comprises comparing the track quality classification metric with a threshold.

18. The method of claim 16, wherein the threshold is set at a value that distinguishes a distribution in the track quality classification metric for failed tracks that can be reprocessed within the track gap period from another distribution in the track quality classification metric for failed tracks that cannot be reprocessed within the track gap.

19. The method of claim 18, wherein the threshold is tuned to balance a likelihood of an incorrect decision that a failed track can be reprocessed within the track gap period with another likelihood of an incorrect decision that a failed track cannot be reprocessed within the track gap period.

20. A storage system comprising:
   a storage medium; and
   at least one circuit to:
      retrieve data tracks from the storage medium;
      detect data values in the data tracks and for decoding the data tracks;
      compare a track quality classifier metric with a threshold when one of the data tracks fails to converge during detecting the data values and decoding the data tracks, wherein when the track quality classifier metric for said one of the data tracks is below the threshold said one of the data tracks is classified as a good track; and
   cause good tracks to be reprocessed in a track gap period between processing periods for the data tracks.

* * * * *